United States Patent [19]
Bianco

[11] 3,786,406
[45] Jan. 15, 1974

[54] AUTOMATIC DEVICE FOR SIGNALING FROGMAN ACCIDENTS

[76] Inventor: Ettore Bianco, Via Triulziana, 52, San Donato Milanese, Italy

[22] Filed: Sept. 3, 1971

[21] Appl. No.: 177,760

[30] Foreign Application Priority Data
Sept. 3, 1970 Italy.................................. 29296/70

[52] U.S. Cl.................. 340/5 R, 340/283, 340/416, 340/421
[51] Int. Cl. .......................................... H04b 11/00
[58] Field of Search .................... 340/5 R, 5 T, 283, 340/416, 421

[56] References Cited
UNITED STATES PATENTS
3,469,231  9/1969  Geiling et al........................ 340/5 T Primary Examiner—Richard A. Farley
Attorney—Ralph M. Watson

[57] ABSTRACT

A novel system for detecting frogman accidents is disclosed. The system comprises an electronic sending system which emits an regualar acoustical signal, provided that the submerged frogman periodicaly actuates a lever and a receiving system which receives the acoustical signal and transforms it electronically to an audial signal. If the frogman fails to periodically actuate the lever, then the transmitter automatically sets off an alarm.

1 Claim, 2 Drawing Figures

AUTOMATIC DEVICE FOR SIGNALING FROGMAN ACCIDENTS

This invention relates to an automatic device for signaling frogman accidents which allows, by means of a suitable transmitting-receiving system, to signal timely and certainly the diseased condition of the frogman, allowing in such a way an efficacious intervention from the mother-ship.

The underwater work effected by frogmen, the man being engaged to work in a not natural ambience, presents remarkable risks as, e.g., possible laceration of pipes carrying breathable gaseous mixtures to the mouth or to the helmet, too quick immersion, intoxication by oxygen, etc. Said risks may cause serious damage to the frogman, very often causing his fainting away.

There are in the art no such signaling devices and a frogman accident is detected generally from the mother-ship by means of the normal systems of communication with the unit operating under the water. In these conditions the communication of a particular emergency state from the frogman is a function of the degree of the accident which conditions all the reflexes and the capability of the operator.

The device which is the object of the present invention permits automatically and continuously checking the conditions of the frogman apart from the effective possibility of this latter of sending emergency signals, permitting therefore in case of accident, a rapid and timely intervention from the mother-ship. The invention is now illustrated particularly with reference to the enclosed drawings showing a preferential form of practical realization given only by way of example.

Figure 1:
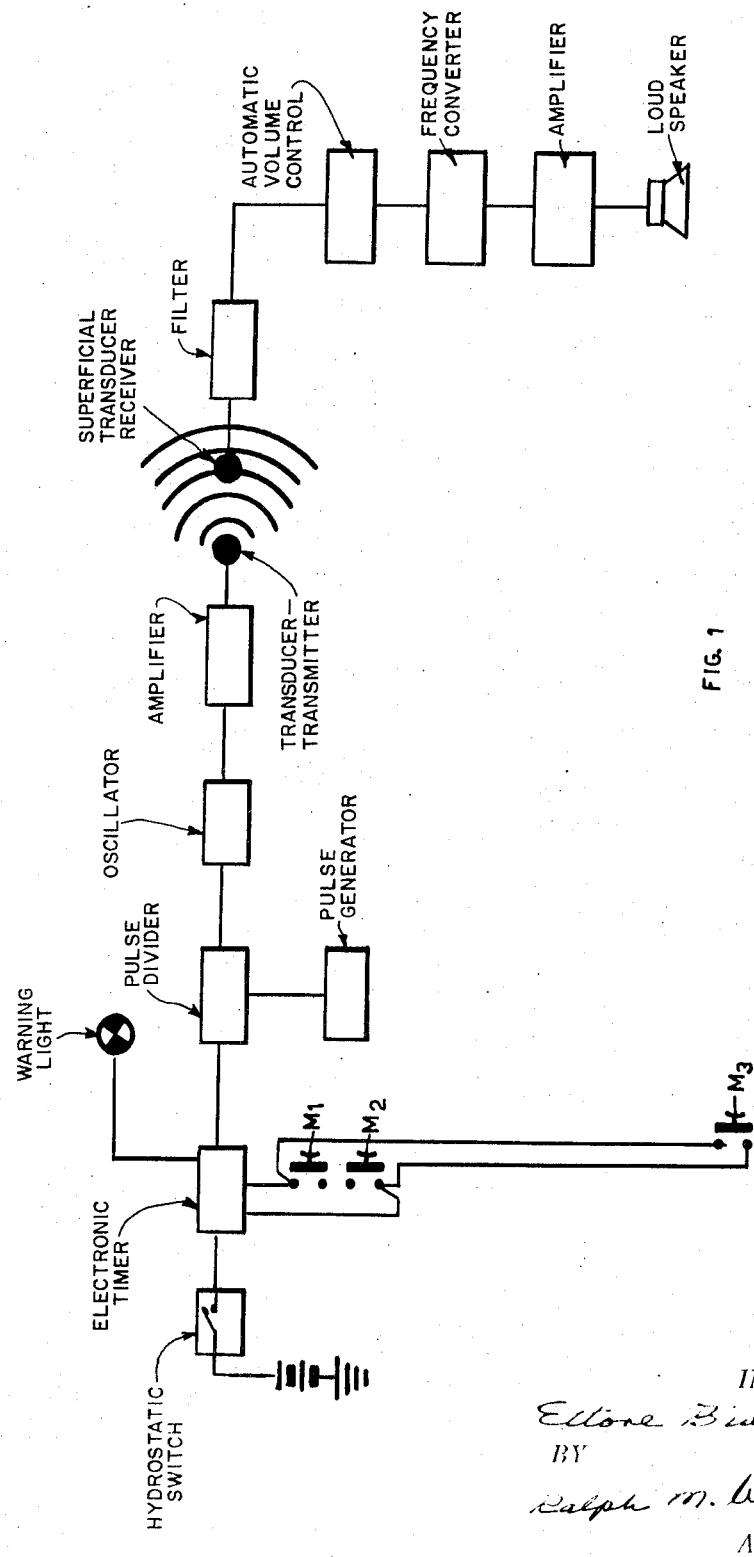
FIG. 1 shows block diagram of the components of the device which is the object of the present invention.

The device which is the object of the present invention consists of two distinct parts one of which is arranged on the body of the frogman and the other is arranged on the mother-ship. The working of said device is now described with reference to FIG. 1.

As soon as the frogman reaches a 3 meter depth, a 3 meter calibrated hydrostatic switch (a) closes, the circuit is then closed and apparatus start to operate.

The pulse generator (e) produces pulses having an 0.2 sec. duration. With a repetition frequency of 1 Hz; said pulses are fed to the pulse divider (d) which divides by five the inlet repetition frequency, whereby at the outlet there are pulses having a frequency of 0.2 Hz. Successively said pulses are modulated to a frequency of 25 KHz produced by oscillator (f) they are amplified by amplifier (g) and therefore converted in acoustic pulses by transducer-transmitter (h) irradiating them into the water. Said pulses propagating in water reach superficial transducer (i) where they are transformed into electric pulses and sent to a filter 1 which has the task of stopping the environmental marine noises interfering with the acoustic pulses.

This filter has a band width such as to optimize the ratio signal-noise and to take into account the eventual movements of the frogman as to the ship (Doppler effect) and of the slipping of the 25 KHz oscillator.

Said pulses pass from the filter to the converter having a frequency (n) which transforms the modulating frequency from 25 KHz to 800 Hz. Between the filter and the converter there is an automatic control of volume (m) which takes into account the amplitude variations of the coming pulses in function of the ship-frogman distance.

Finally the converted pulses, after having been amplified by amplifier (o), are propagated by loud-speaker P.

In normal conditions the loud-speaker P irradiates therefore pulses having a duration of 0.2 sec., and a repetition frequency of 0.2 Hz, said pulses being modulated with a frequency of 800 Hz.

In order to keep such a normal condition the frogman must every 80 sec. press the two levers $M_1$ and $M_2$, in this way two switches $M_1$ and $M_2$ close and the electronic timer (b) is reset to zero. As a variant in order to reset the timer, instead of pressing the two levers $M_1$ and $M_2$ one may press with the head a push button $M_3$ arranged inside the frogman's helmet. If after 80 sec. since the last zero setting the frogman forgets to press the levers a yellow warning light (c) arranged on the watertight box lights. After further 10 sec., if the frogman has not effected the zero setting, the electronic timer (b) sends a suitable drive pulse to the frequency divider (d) which at its turn ceases from effecting the division by 5 of pulses emitted from the generator.

Accordingly the loud-speaker irradiates pulses with a frequency of 1 Hz, said pulse frequency variation is considered by the mother-ship as a state of frogman's accident.

In order to return to the normal state i.e., to the repetition frequency of 0.2 Hz, it is necessary that the two levers $M_1$ and $M_2$ or the push $M_3$ are pressed three times in a 5 sec. period, otherwise the alarm state keeps on till the battery is exhausted.

Figure 2:
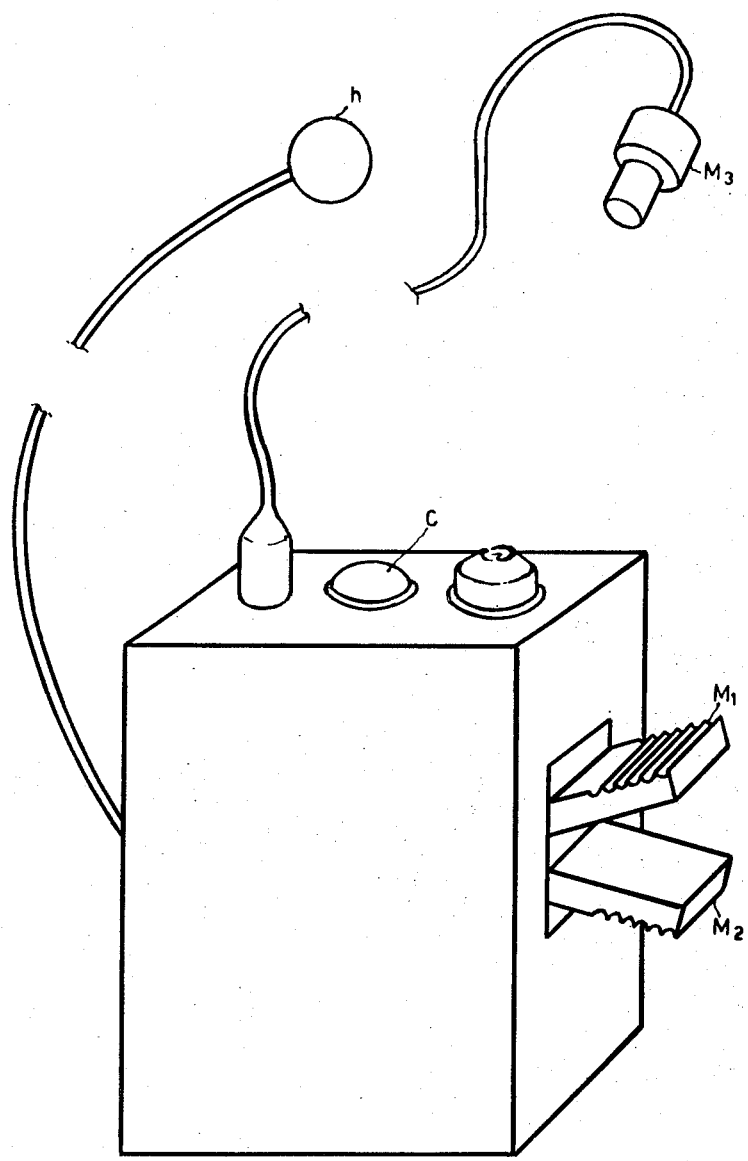
FIG. 2 shows a perspective view of the device arranged on the body of a frogman.

FIG. 2 shows a perspective view of the transmitting device arranged on the frogman body.

Said figure shows transducer (h), a warning light (c), hydrostatic switch (a), levers $M_1$ and $M_2$ resetting to zero the electronic timer, and pushbutton $M_3$.

Although the present invention has been described in connection with particular realization forms, numerous variants and modifications may be thought without departing from the present invention.

I claim:

1. An automatic device for signaling the accident of a frogman comprising a pulse generator having an amplifier, said amplifier including a transducer for transforming pulses generated by said pulse generator and amplifier by said amplifier into acoustical pulses, transmitter means for transmitting said acoustical pulses through an aqueous medium, and receiving means for receiving said acoustical pulses transmitted through said aqueous medium and for transforming said acoustical pulses into electrical pulses, said receiving means including filtering means for preventing acoustical interference, means for amplifying said electrical pulses, said means for amplifying electrical pulses including loudspeaker means for diffusing said electrical pulses as audible signals into the air, said pulse generator including an electronic timer having lever means which, when actuated at a pre-set periodic interval, resets said electronic timer to reduce the repetitive frequency of the pulses generated by said pulse generator so that, in the event of an accident and the failure of the frogman to activate said lever at said pre-set periodic frequency, an audible signal at a higher frequency is diffused by said loud-speaker means.

* * * * *

UNITED STATES PATENT OFFICE
CERTIFICATE OF CORRECTION

Patent No. 3,786,406     Dated January 15, 1974

Inventor(s) Ettore Bianco

It is certified that error appears in the above-identified patent and that said Letters Patent are hereby corrected as shown below:

First page of patent after line "[76]" insert the following line:

-- [73] Assignee:  Snam Progetti S.p.A., San Donato Milanese, Italy --.

Signed and sealed this 12th day of November 1974.

(SEAL)
Attest:

McCOY M. GIBSON JR.
Attesting Officer

C. MARSHALL DANN
Commissioner of Patents